United States Patent
Hochstetler et al.

(10) Patent No.: US 10,707,792 B2
(45) Date of Patent: Jul. 7, 2020

(54) VARIABLE WOBBLER PLATE FOR INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 357 days.

(21) Appl. No.: 15/874,160

(22) Filed: Jan. 18, 2018

(65) Prior Publication Data
US 2019/0222154 A1   Jul. 18, 2019

(51) Int. Cl.
| | | |
|---|---|---|
| F16H 21/00 | (2006.01) | |
| F16H 37/16 | (2006.01) | |
| H02P 9/42 | (2006.01) | |
| F04B 35/04 | (2006.01) | |
| F04B 1/2078 | (2020.01) | |
| F04B 1/2085 | (2020.01) | |
| H02P 101/30 | (2015.01) | |

(52) U.S. Cl.
CPC .............. *H02P 9/42* (2013.01); *F04B 1/2078* (2013.01); *F04B 1/2085* (2013.01); *F04B 35/04* (2013.01); *H02P 2101/30* (2015.01)

(58) Field of Classification Search
CPC ...... H02P 9/42; H02P 2101/30; F04B 1/2078; F04B 1/2085; F04B 35/04
See application file for complete search history.

(56) References Cited

U.S. PATENT DOCUMENTS

2013/0224044 A1 * 8/2013 Maruoka ................... F04B 1/20
                                                                417/269
2018/0328350 A1 * 11/2018 Matsuo ................. F04B 1/2035

FOREIGN PATENT DOCUMENTS

| CA | 847588 A | 7/1970 |
|---|---|---|
| GB | 1329283 A | 9/1973 |
| WO | 86/03352 A1 | 6/1986 |

OTHER PUBLICATIONS

European Search Report for EP Application No. 19151933.9 dated Mar. 11, 2019.

* cited by examiner

*Primary Examiner* — Jake Cook
(74) *Attorney, Agent, or Firm* — Carlson, Gaskey & Olds, P.C.

(57) ABSTRACT

A variable wobbler plate has a stub shaft and a pivot shaft. The pivot shaft has a smaller diameter portion and a larger diameter portion. The smaller diameter portion has a generally cylindrical outer periphery with a flat over a limited circumferential extent and a diameter to opposed portions of the generally cylindrical portion defining a first distance. A second distance is defined from an end of the smaller diameter portion spaced furthest from the stub shaft to an end of the larger diameter portion spaced closest to the stub shaft and measured along a central axis of the pivot shaft and defines a second distance. A ratio of the first distance to the second distance is between 0.60 and 0.75. An integrated drive generator and a method are also disclosed.

20 Claims, 5 Drawing Sheets

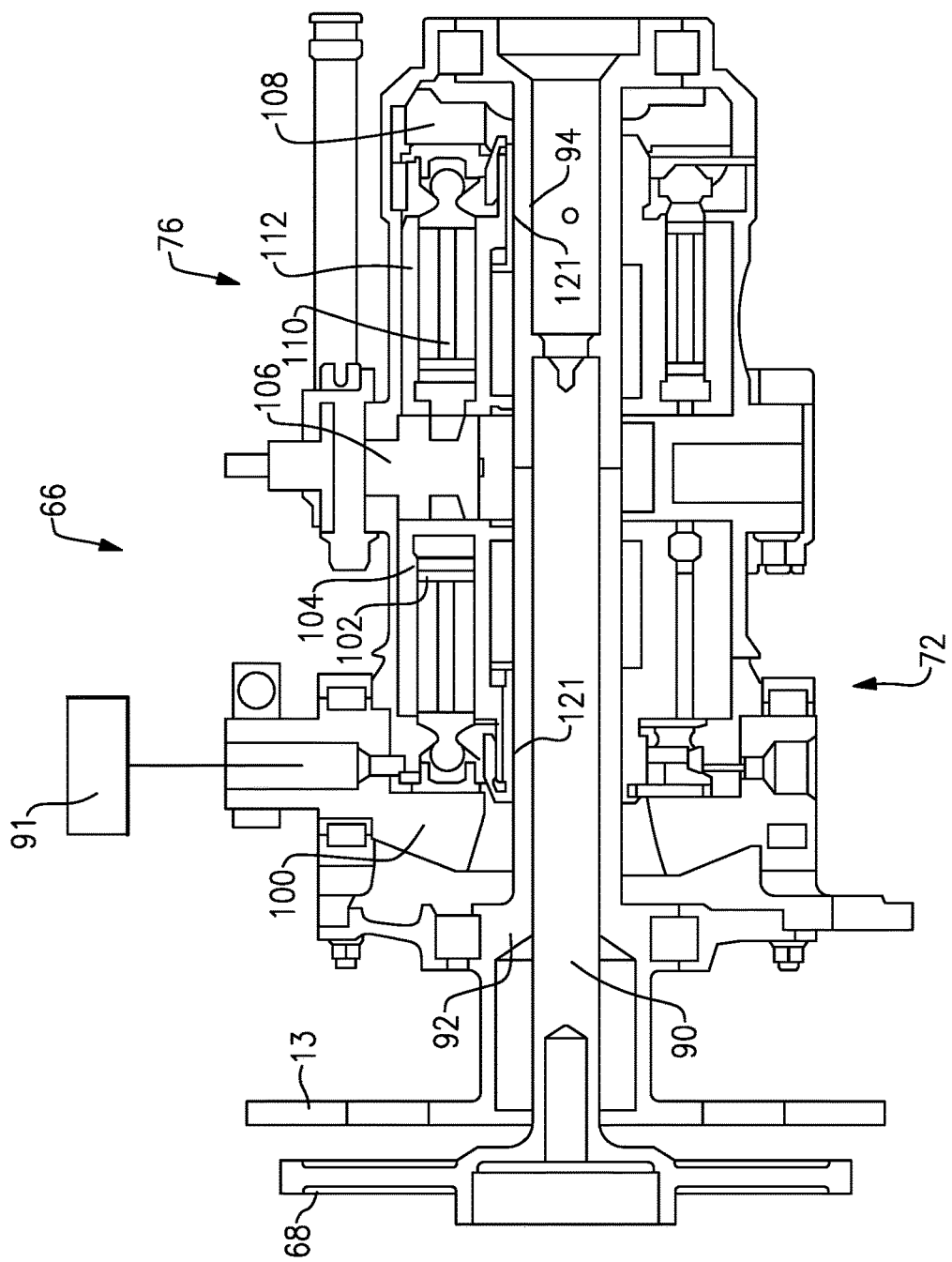
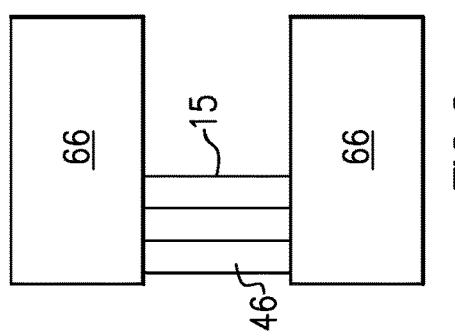

VARIABLE WOBBLER PLATE FOR INTEGRATED DRIVE GENERATOR

BACKGROUND

This application relates to a variable wobbler or swash plate for use in a hydraulic unit of an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the ring gear of the differential through an accessory drive gear.

Variable wobbler plates as utilized in the hydraulic unit of an integrated drive generator face design challenges.

SUMMARY

A variable wobbler plate for use in an integrated drive generator has a cam surface on one face and an opposed non-working surface on an opposed face. A stub shaft extends at one side of the body and a pivot shaft extends at a diametrically opposed location on the body from the stub shaft. The pivot shaft has a smaller diameter portion and a larger diameter portion with the larger diameter portion spaced towards the stub shaft from the smaller diameter portion. The smaller diameter portion has a generally cylindrical outer periphery with a flat over a limited circumferential extent and a diameter to opposed portions of the generally cylindrical portion defining a first distance. A second distance is defined from an end of the smaller diameter portion spaced furthest from the stub shaft to an end of the larger diameter portion spaced closest to the stub shaft and measured along a central axis of the pivot shaft. A ratio of the first distance to the second distance is between 0.60 and 0.75.

An integrated drive generator and a method of replacing a variable wobbler plate in an integrated drive generator are also disclosed and claimed.

These and other features may be best understood from the following drawings and specification.

BRIEF DESCRIPTION OF THE DRAWINGS

FIG. 2 schematically shows hydraulic units in the integrated drive generator.
FIG. 3 shows the components of a hydraulic unit.

DETAILED DESCRIPTION

Figure 1:
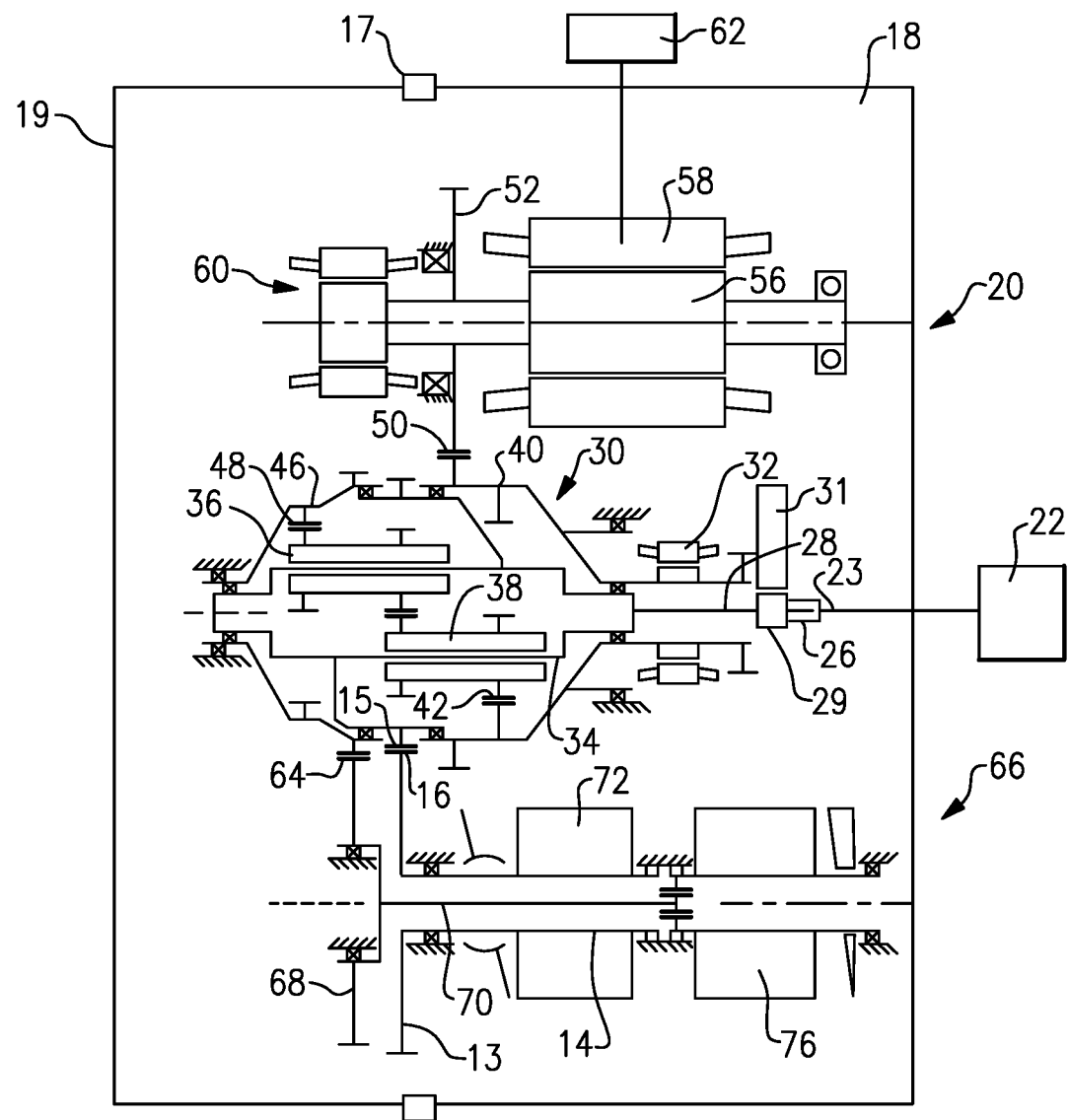
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and the speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with ring gear 40 and drives a plurality of accessory gears 31.

The operation of the integrated drive generator 20 is generally as known in the art. A worker of ordinary skill would recognize that the desired frequency and speed at use 62 would dictate a number of design functions.

FIG. 2 shows that there are a pair of hydraulic or speed trimming units 66 associated with a single ring gear 46 and a single carrier 15.

FIG. 3 shows details of the hydraulic unit 66. A speed into the gear 13 will be proportional to the speed from the input shaft 23. The gear 13 rotates with a shaft 92. The shaft 92 is supported on bearing 93. The shaft, through splined teeth 121, drives a cylinder block 104 to rotate.

The shaft 90 is called a fixed block shaft, although it rotates. The shaft 90 is supported on a bearing 132 received on a bearing race 130 on the fixed shaft 90. In addition, an inner race 134 for the bearing 132 is mounted on a housing 135. The inner race 134 includes a race surface 136.

A control 91 changes the position of a swash plate or wobbler 100 based upon the input speed seen at the generator. As the cylinder block 104 rotates, pistons 102 within the cylinder block cam off a surface of the swash plate 100. As the position of the swash plate 100 is changed by control 91, the amount of hydraulic fluid driven by the pistons 102, through a port plate 106, and against piston 110 in a cylinder block 112 changes. As the pistons 110 move, they cam off a surface of fixed swash plate or wobbler 108. This results in a control of a speed and direction of rotation of cylinder block 112. Cylinder block 112 has a spline connection at 121 to a shaft 94. Thus, the hydraulic unit 66 results in a desired speed and direction of rotation of the shaft 94, ultimately based upon the input speed seen at the generator. The shaft 94 drives the shaft 90 through spline connection 137 to in turn drive the gear 68. The gear 68 interacts with the trim ring gear 46 such that the ultimate speed leaving the differential 30 to the gear 52 is controlled to achieve a constant desired speed at the generator.

The cylinder blocks 104 and 112 are effectively identical. In addition, there are similar cylinder blocks 104/112 in both of the hydraulic units 66.

Figure 4:
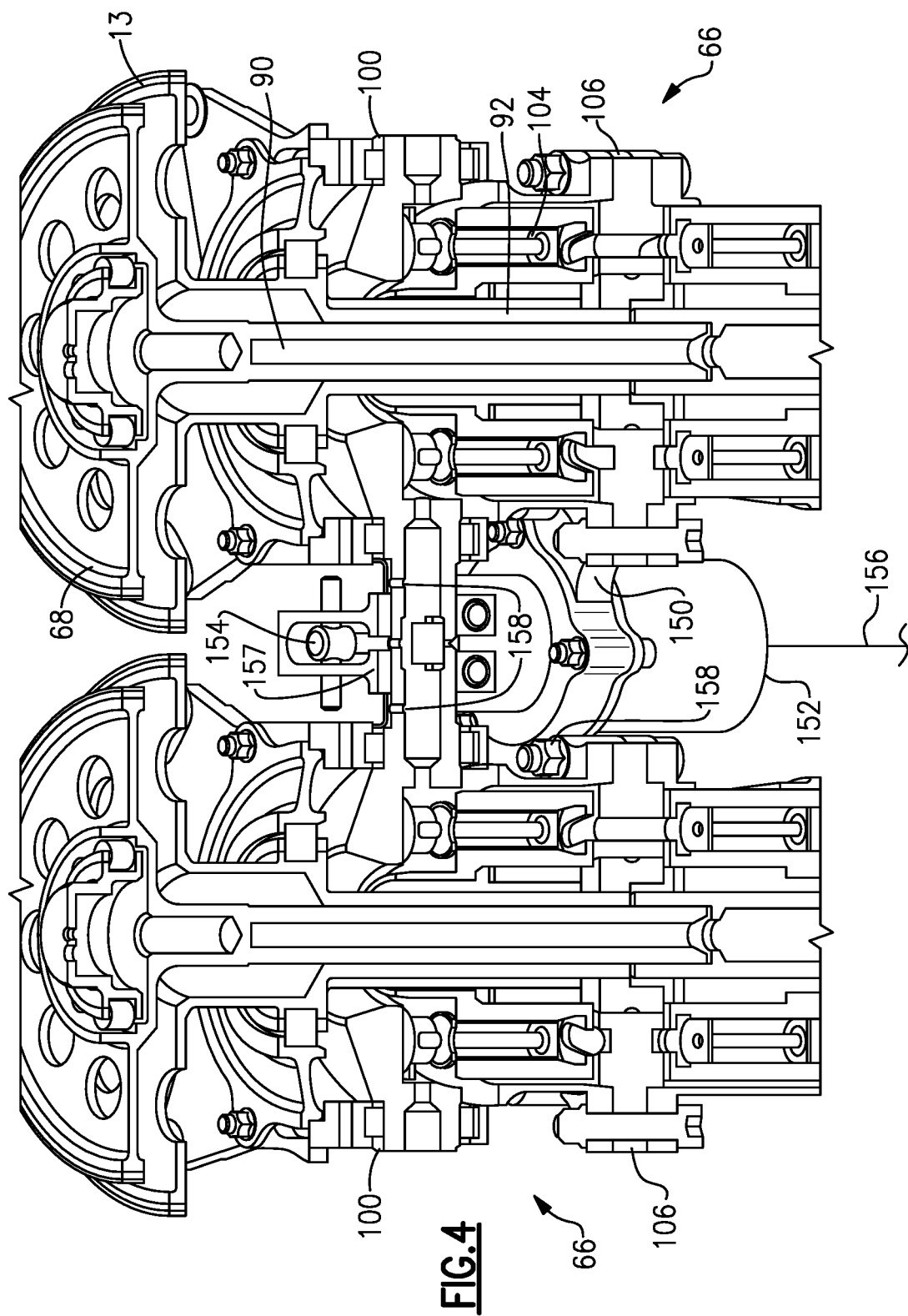
FIG. 4 shows details of the connection between the two hydraulic units in an integrated drive generator.

FIG. 4 shows details of the interconnection of the two hydraulic units 66. While it was stated that the components in the two hydraulic units are generally the same, there are certain differences. As one example, the port plates 106 in the two hydraulic units include one port 106 that includes a bracket mount 150 for receiving a hydraulic cylinder 152. Hydraulic cylinder 152 includes a piston 154, which is driven to pivot a lever 157 which cause pivot shaft portions 158 on the variable wobbler plates 100 to rotate some amount and, thus, change the orientation of the cam surfaces on the variable wobbler plates 100. A control 156 communicates fluid into the cylinder 152 such that the variable wobbler plates 100 are positioned to provide relatively constant speed to the generator.

Control 156 may be a mechanical governor, such as a flyball governor. In one embodiment, a rotating spool valve has its position controlled by centrifugal force from flywheels rotating about a spool centerline, and against a spring force.

It can also be seen that the shafts 158 on the two wobbler plates 100 extend in opposed directions from cam surfaces on the wobbler plates 100. That is, when the hydraulic units 66 are assembled, the two shaft portions extend towards each other. This is another example of how components in the two units differ.

Figure 5A:
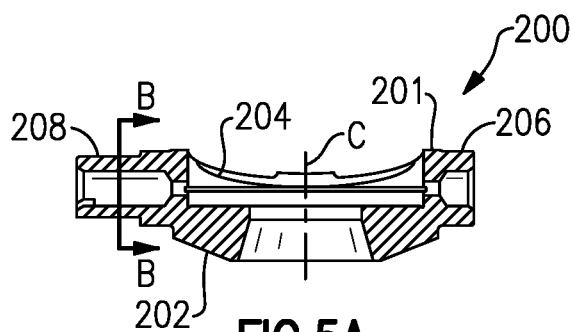
FIG. 5A shows a first variable wobbler plate.

FIG. 5A shows a variable wobbler plate 200 for use in one of the two hydraulic units 66. A body 201 has a non-working surface 202 and a cam or working surface 204 which provides a cam surface for the pistons as they rotate with their cylinder block. The shaft portions 208 are bolted to the lever as shown in FIG. 4.

Figure 5B:
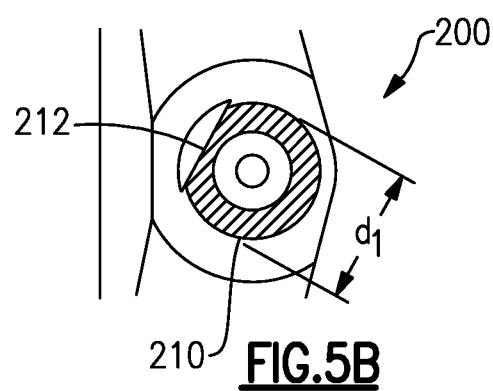
FIG. 5B shows a section along line B-B of FIG. 5A.

FIG. 5B shows a detail of the shaft portion 208. There is a generally cylindrical outer surface 210, however, there is also a flat 212 over a circumferential portion of the outer periphery 210 to facilitate being secured to the lever 157. An outer diameter at the cylindrical portion 210 of the shaft 208, is defined as a first distance $d_1$.

Figure 5C:
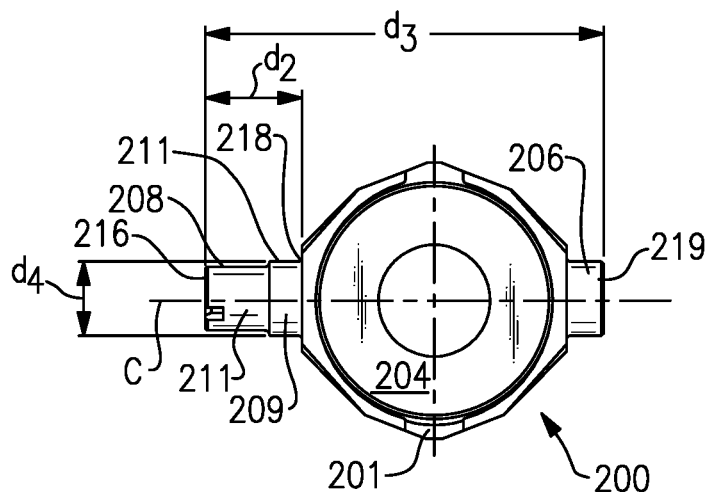
FIG. 5C shows a view of a cam surface of a variable wobbler plate.

FIG. 5C is a view showing the cam surface facing view of the variable wobbler plate 200. As shown, the shaft portion 208 has a radially smaller portion 211 and a radially enlarged portion 209. The smaller portion 211 extends from a remote end 216 to an enlarged portion 209 and its end 218, adjacent to the cam surface. A second distance $d_2$ is defined between end 116 and 218 and generally along a center axis C of the shaft portion 208. A distance $d_3$ is defined between the outer end 216 and a remote end 219 of a stub shaft portion 206, which will be supported in a bearing.

In an embodiment, $d_1$ was 0.830 inches (2.108 centimeters), $d_2$ was 1.257 inches (3.193 centimeters), and $d_3$ was 5.170 inches (13.132 centimeters). An outer diameter $d_4$ to an outer surface 211 of the enlarged portion 209 was 0.966 inch (2.454 centimeters) in one embodiment. It should be understood that all dimensions in this application should be taken with a tolerance range of +/−0.010 inch (0.025 centimeter). In embodiments, a ratio of $d_1$ to $d_2$ is between 0.60 and 0.75. A ratio of $d_2$ to $d_3$ is between 0.20 and 0.30. A ratio of $d_1$ to $d_4$ is between 0.75 and 1.00.

Figure 5D:
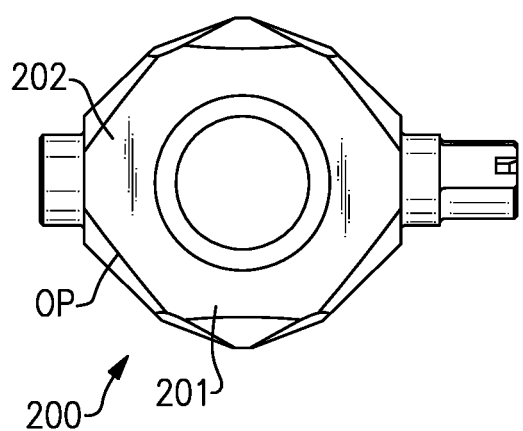
FIG. 5D shows the opposite side of the variable wobbler plate.

FIG. 5D shows the non-working surface 202 of the wobbler plate 200. As shown, an outer periphery OP is formed as a polygon.

Figure 6A:
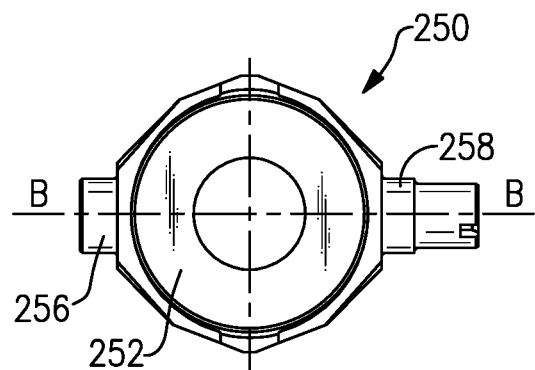
FIG. 6A shows a second wobbler plate as incorporated into the integrated drive generator.
Figure 6B:
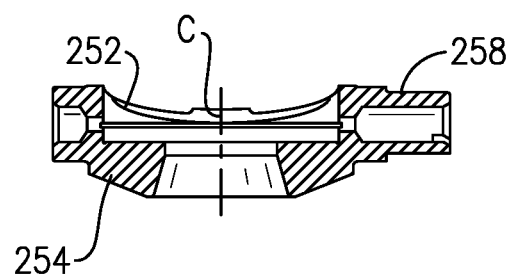
FIG. 6B is a cross-section along line B-B of FIG. 6A.

The variable wobbler plate 250 for the opposed hydraulic unit 66 is illustrated in FIG. 6. Here, the variable wobbler plate has its cam surface 252 and its non-working surface 254. As can be appreciated, while in the view of FIG. 5C, the shaft portion 208 extends to the left in the component illustrated in FIG. 6, the shaft portion 258 extends toward the right. Of course, these directions are relative, but when mounted in the arrangement, as shown in FIG. 4, the shaft portions 208 and 258 extend towards each other. The wobbler plate 250 has stub shaft 256. It further has a non-working side 254. See FIG. 6B, similar to the embodiment of FIGS. 5A-5D. The dimensions disclosed above and the ratios disclosed above all apply to the wobbler plate 250 also. Essentially, the plates 200 and 250 are mirror images of each other.

A method of replacing a wobbler plate in an integrated drive generator includes the steps of removing an existing wobbler plate from an integrated drive generator having an input shaft connected to a differential. The differential is connected to a generator, and to a hydraulic unit. The hydraulic unit includes the existing variable wobbler plate and a fixed wobbler plate, each of which is associated with a set of pistons. A fixed shaft is associated with the fixed wobbler plate, and is connected to rotate by a cylinder block associated with the fixed wobbler plate. The fixed shaft includes a spline connection to drive a fixed block shaft, which has gear teeth engaged to a ring gear in the differential. The existing variable wobbler plate is replaced with a replacement variable wobbler plate having a body with a cam surface on one face and an opposed non-working surface on an opposed face. A stub shaft extends at one side of the body and a pivot shaft extending at a diametrically opposed location on the body from the stub shaft, the pivot shaft having a smaller diameter portion and a larger diameter portion with the larger diameter portion spaced towards the stub shaft from the smaller diameter portion, and the smaller diameter portion having a generally cylindrical outer periphery with a flat over a limited circumferential extent and a diameter to opposed portions of the generally cylindrical portion defining a first distance, and a second distance being defined from an end of the smaller diameter portion spaced furthest from the stub shaft to an end of the larger diameter portion spaced closest to the stub shaft and measured along a central axis of the pivot shaft and defining a second distance, and a ratio of the first distance to the second distance being between 0.60 and 0.75.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A variable wobbler plate for use in an integrated drive generator comprising:
a cam surface on one face and an opposed non-working surface on an opposed face, a stub shaft extending at one side of said body, and a pivot shaft extending at a diametrically opposed location on said body from said stub shaft, said pivot shaft having a smaller diameter portion and a larger diameter portion with said larger diameter portion spaced towards said stub shaft from said smaller diameter portion, and said smaller diameter portion having a generally cylindrical outer periphery with a flat over a limited circumferential extent and a diameter to opposed portions of said generally cylindrical portion defining a first distance, and a second distance being defined from an end of said smaller diameter portion spaced furthest from said stub shaft to an end of said larger diameter portion spaced closest to said stub shaft and measured along a central axis of said pivot shaft and defining a second distance, and a ratio of said first distance to said second distance being between 0.60 and 0.75.

2. The variable wobbler plate as set forth in claim 1, wherein a third distance is defined between said end of said smaller diameter portion and to a remote end of said stub shaft, and along said center axis and a ratio of said second distance to said third distance being between 0.20 and 0.30.

3. The variable wobbler plate as set forth in claim 2, wherein an outer diameter of said larger diameter portion defining a larger diameter portion outer diameter and said larger portion outer diameter being defined as a fourth distance, and a ratio of said first distance to said fourth distance being between 0.75 and 1.00.

4. The variable wobbler plate as set forth in claim 3, wherein said non-working surface having a polygonal outer periphery.

5. The variable wobbler plate as set forth in claim 1, wherein an outer diameter of said larger diameter portion defining a larger diameter portion outer diameter and said larger portion outer diameter being defined as a fourth distance, and a ratio of said first distance to said fourth distance being between 0.75 and 1.00.

6. The variable wobbler plate as set forth in claim 5, wherein said non-working surface having a polygonal outer periphery.

7. The variable wobbler plate as set forth in claim 1, wherein said non-working surface having a polygonal outer periphery.

8. An integrated drive generator comprising:
an input shaft connected to a differential, said differential connected to a generator, and said differential also being connected to a hydraulic unit, said hydraulic unit including a variable wobbler plate and a fixed wobbler plate, and each of said wobbler plates being associated with a set of pistons, and a fixed shaft associated with said fixed shaft plate, and connected to rotate with a cylinder block associated with said fixed wobbler plate, and said fixed shaft including a spline connection to drive a fixed block shaft, said fixed block shaft having gear teeth engaged to a ring gear in said differential; and
said variable wobbler plate having a body with a cam surface on one face and an opposed non-working surface on an opposed face, a stub shaft extending at one side of said body and a pivot shaft extending at a diametrically opposed location on said body from said stub shaft, said pivot shaft having a smaller diameter portion and a larger diameter portion with said larger diameter portion spaced towards said stub shaft from said smaller diameter portion, and said smaller diameter portion having a generally cylindrical outer periphery with a flat over a limited circumferential extent and a diameter to opposed portions of said generally cylindrical portion defining a first distance, and a second distance being defined from an end of said smaller diameter portion spaced furthest from said stub shaft to an end of said larger diameter portion spaced closest to said stub shaft and measured along a central axis of said pivot shaft and defining a second distance, and a ratio of said first distance to said second distance being between 0.60 and 0.75.

9. The integrated drive generator as set forth in claim 8, wherein a third distance is defined between said end of said smaller diameter portion and to a remote end of said stub shaft, and along said center axis and a ratio of said second distance to said third distance being between 0.20 and 0.30.

10. The integrated drive generator as set forth in claim 9, wherein an outer diameter of said larger diameter portion defining a larger diameter portion outer diameter and said larger portion outer diameter being defined as a fourth distance, and a ratio of said first distance to said fourth distance being between 0.75 and 1.00.

11. The integrated drive generator as set forth in claim 10, wherein said non-working surface having a polygonal outer periphery.

12. The integrated drive generator as set forth in claim 8, wherein an outer diameter of said larger diameter portion defining a larger diameter portion outer diameter and said larger portion outer diameter being defined as a fourth distance, and a ratio of said first distance to said fourth distance being between 0.75 and 1.00.

13. The integrated drive generator as set forth in claim 8, wherein said non-working surface having a polygonal outer periphery.

14. The integrated drive generator as set forth in claim 8, wherein there are a pair of said hydraulic units and each of said hydraulic units including one of said variable wobbler plates with said pivot shafts in said variable wobbler plates extending towards each other and a cylinder containing a piston, said piston having a lever secured to said pivot shafts of each of said variable wobbler plates.

15. A method of replacing a wobbler plate in an integrated drive generator comprising the steps of:
   a) removing an existing wobbler plate from an integrated drive generator having an input shaft connected to a differential, said differential connected to a generator, and said differential also being connected to a hydraulic unit, said hydraulic unit including said existing variable wobbler plate and a fixed wobbler plate, and each of said wobbler plates being associated with a set of pistons, and a fixed shaft associated with said fixed wobbler plate, and connected to rotate by a cylinder block associated with said fixed wobbler plate, and said fixed shaft including a spline connection to drive a fixed block shaft, said fixed block shaft having gear teeth engaged to a ring gear in said differential; and
   b) replacing said existing variable wobbler plate with a replacement variable wobbler plate having a body with a cam surface on one face and an opposed non-working surface on an opposed face, a stub shaft extending at one side of said body and a pivot shaft extending at a diametrically opposed location on said body from said stub shaft, said pivot shaft having a smaller diameter portion and a larger diameter portion with said larger diameter portion spaced towards said stub shaft from said smaller diameter portion, and said smaller diameter portion having a generally cylindrical outer periphery with a flat over a limited circumferential extent and a diameter to opposed portions of said generally cylindrical portion defining a first distance, and a second distance being defined from an end of said smaller diameter portion spaced furthest from said stub shaft to an end of said larger diameter portion spaced closest to said stub shaft and measured along a central axis of said pivot shaft and defining a second distance, and a ratio of said first distance to said second distance being between 0.60 and 0.75.

16. The method of replacing a wobbler plate as set forth in claim 15, wherein a third distance is defined between said end of said smaller diameter portion and to a remote end of said stub shaft, and along said center axis and a ratio of said second distance to said third distance being between 0.20 and 0.30.

17. The method of replacing a wobbler plate as set forth in claim 16, wherein an outer diameter of said larger diameter portion defining a larger diameter portion outer diameter and said larger portion outer diameter being defined as a fourth distance, and a ratio of said first distance to said fourth distance being between 0.75 and 1.00.

18. The method of replacing a wobbler plate as set forth in claim 15, wherein an outer diameter of said larger diameter portion defining a larger diameter portion outer diameter and said larger portion outer diameter being defined as a fourth distance, and a ratio of said first distance to said fourth distance being between 0.75 and 1.00.

19. The method as set forth in claim 15, wherein said non-working surface having a polygonal outer periphery.

20. The method of replacing a wobbler plate as set forth in claim 15, wherein there are a pair of said hydraulic units and each of said hydraulic units including one of said variable wobbler plates with said pivot shafts in said variable wobbler plates extending towards each other and a cylinder containing a piston said piston having a lever secured to said pivot shafts of each of said variable wobbler plates.

\* \* \* \* \*